Oct. 17, 1961  J. U. WHITE  3,004,465
APPARATUS FOR REDUCING EFFECT OF SCATTERED
LIGHT IN MONOCHROMATORS
Filed Sept. 19, 1956  3 Sheets-Sheet 1

Oct. 17, 1961  J. U. WHITE  3,004,465
APPARATUS FOR REDUCING EFFECT OF SCATTERED
LIGHT IN MONOCHROMATORS
Filed Sept. 19, 1956  3 Sheets-Sheet 2

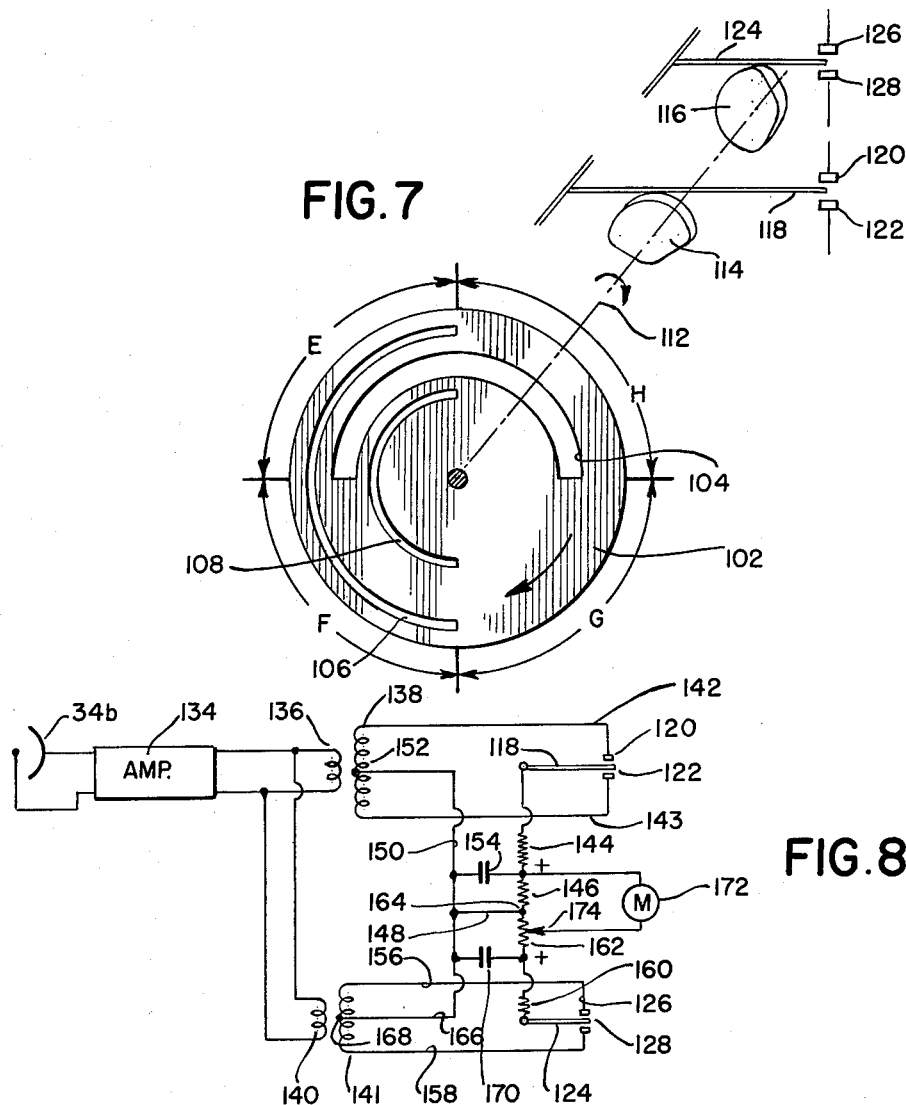

United States Patent Office 3,004,465
Patented Oct. 17, 1961

3,004,465
APPARATUS FOR REDUCING EFFECT OF SCATTERED LIGHT IN MONOCHROMATORS
John U. White, Darien, Conn., assignor to The White Development Corporation, Stamford, Conn., a corporation of Connecticut
Filed Sept. 19, 1956, Ser. No. 610,761
21 Claims. (Cl. 88—14)

This invention relates to a method and apparatus for selecting and measuring the intensity of a portion of a spectrum. The invention is particularly applicable to monochromators.

It will be understood that a monochromator may include an entrance slit for admitting light from a source, a collimator, such as a lens or mirror, a dispersing element, such as a prism or diffraction grating, and an exit slit. Light entering the entrance slit is passed along a path including the collimator and the dispersing element, is dispersed into a spectrum by the dispersing element, and a dispersed image of the entrance slit is formed in the region of the exit slit, so that by positioning the exit slit one may allow a selected, almost monochromatic, portion of the light to emerge through the exit slit. (As used herein, the term "light" is not restricted to visible light, but may include radiation having wave lengths longer or shorter than the visible spectrum.) Light emerging through the exit slit is sensed by a detector or photo-responsive device, such as a photomultiplier tube, for example, for generating a voltage related to the intensity of the radiation in the selected portion of the spectrum.

In order that the voltage may be readily amplified by A.-C. amplifiers, which have certain advantages over D.-C. amplifiers, the apparatus may include a radiation chopper, which may precede the entrance slit. The radiation falling on the detector is then pulsating, and the voltage signal derived from the detector is alternating in character, so that it may be readily amplified by A.-C. amplifiers.

One difficulty encountered in such apparatus is that the light emerging from the exit slit includes not only light of the desired length, but also some light of other wave lengths because of scattering within the apparatus of some of the light entering through the entrance slit. This effect tends to cause inaccuracies in the measurement.

An object of the present invention is to reduce the effect of scattered light in apparatus of this type.

The method and apparatus of the invention represent an extremely novel approach to this problem, and the unique mode of operation described herein produces beneficial results which are surprising in both character and degree.

In one form of the invention, there is provided, in a monochromator, a novel light-chopper together with a novel combination of the chopper with other elements associated with the monochromator. The chopper may be in the form of a moving slotted member, having what may be referred to as a signal portion and a compensating portion. The portions of the monochromator which define and limit the light path, and the relative positions of the detector and the slots of the chopper, are so arranged and located that light of the desired wave length passing through the signal portion of the chopper can readily reach the detector by direct paths (without scattering), along with some scattered light; but light passing through the compensating portion can reach the detector only by scattering and not directly. Light passing through the compensating portion of the chopper, other than scattered light, is prevented from reaching the detector by the relative locations and sizes of the various elements, including the detector and the opaque portions of the chopper; and for this purpose some embodiments of the invention include special masking means positioned to intercept such light. Thus, with the aid of the compensating portion of the chopper, there is directed into the monochromator, additional light through an aperture system such that this additional light cannot reach the detector directly but only by scattering in the monochromator.

The slots in the different portions of the chopper are so arranged that the light is chopped differently by the signal portion and by the compensating portion, in a way to produce an output signal such that the portion of the signal representing the desired light has a different characteristic from the portion of the signal representing the scattered light. The system includes components responsive to this difference in characteristic which discriminate between these two portions.

Thus in one of the embodiments, the size, shape, and location of the slots in the different portions of the chopper are such that the amount of scattered light reaching the detector, when the compensating portion of the chopper is in the light path, is approximately equal to the scattered light reaching the detector when the signal portion is in the light path. The result is that the electrical output from the detector contains an approximately constant (D.-C.) component corresponding to the scattered light, and an alternating component corresponding to the true signal. This alternating or signal component is substantially independent of the scattered light. The A.-C. amplifiers of the system pass the signal component, because it is alternating in nature, but reject the scattered-light component, because it is D.-C. in nature. As a result, the effects of scattered light are minimized or substantially eliminated.

Some other embodiments do not require this balancing of the scattered light, as between the signal and compensating portions of the chopper. Thus, in one embodiment, the chopper produces an output signal including different frequency components representing respectively the desired and scattered light. Succeeding frequency-responsive portions of the system, for example comprising filters, discriminate between these components of the output signal. An indication is thus derived, substantially free from the effects of scattered light.

In another embodiment, the chopper produces an output signal including components of different phase representing respectively the desired and scattered light. Succeeding phase-responsive portions of the system, which may be controlled in timed relation to the instantaneous position of the chopper, discriminate between these components of the output signal.

These and other features and objects obtainable by the practice of the present invention will be readily understood by persons skilled in the art by reference to the following detailed description taken in connection with the annexed drawings, which describe and illustrate a preferred embodiment of the invention, and wherein FIGURE 1 is a schematic horizontal sectional view of a monochromator system including one form of the present invention.

FIGURE 2 is a schematic view of the apparatus shown in FIGURE 1, partly in vertical section and partly in elevation.

FIGURE 3 is an end elevational view of the chopper 16 of FIGURES 1 and 2, as viewed from the position 3—3, shown in FIGURE 2.

FIGURE 7 is a schematic view of still another form of chopper, together with cams and switches synchronized with the chopper.

FIGURE 8 is a schematic circuit diagram of apparatus, including phase-responsive elements, which may be used in connection with a chopper such as that illustrated in FIGURE 7.

Figure 1:
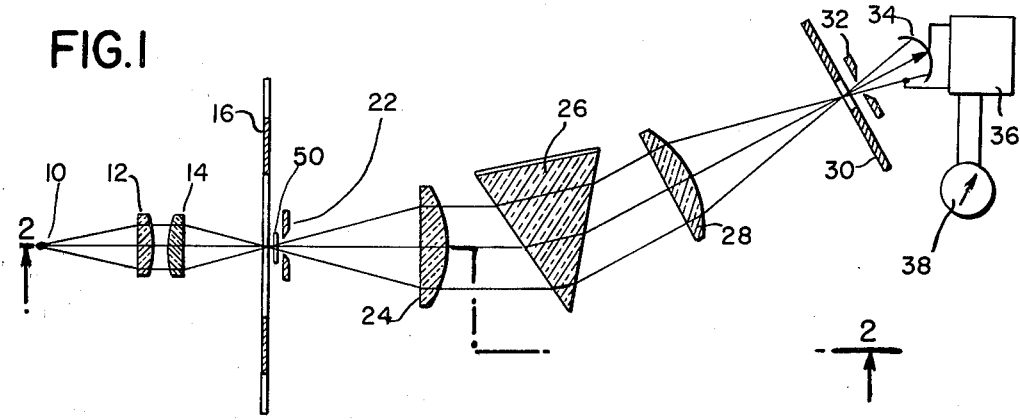

In the embodiment of the invention shown in FIGURE 1, light enters the apparatus from a source 10. It will be understood that this light (visible or invisible) is, by suitable means, derived from or affected by a sample the characteristics of which are to be determined. For example, the sample may itself be caused to radiate, or light may be passed through it before or after passing through the monochromator.

The light from the source 10 passes through lenses 12 and 14, a moving chopper 16, a pair of jaws 22 defining an entrance slit, a lens 24, a prism 26, a lens 28, a mask 30, and a pair of jaws 32 defining an exit slit, and strikes a detector or photo-responsive device 34, which generates an electric signal. The signal is amplified in an A.-C. amplifier 36, and applied to an indicating device such as a voltmeter 38. The amplifier 36 includes means, such as blocking condensers, for rejecting or discriminating against D.-C. signals.

The prism 26, together with the lenses, produces in the region of the exit slit of the jaws 32, a dispersed image of the entrance slit defined by the jaws 22. The lateral positioning of the exit slit defined by the jaws 32 permits the selection of the desired portion of the spectrum.

In the region of the exit slit, the mask 30, in cooperation with the other components, defines an aperture 40. In the arrangement shown, the mask is located just in front of the exit slit. This aperture is effectively wider, horizontally, than the exit slit. Vertically, however, it serves to limit the region through which light may pass, in leaving the monochromator.

The chopper 16 may, in one of its possible forms, comprise a slotted disc, rotated by a motor 41. The slots of the chopper cooperate with the other components of the system in controlling the light reaching the detector 34 at any moment. In the form shown in FIGURE 3, the top half of this chopper may be referred to as the signal sector, and it is shaped to define an opening or light-transmitting arcuate slot 42, which may be referred to as a signal slot. In its regions other than its slots, the chopper is opaque, or considerably more opaque than in the region of its slots.

Figure 3:
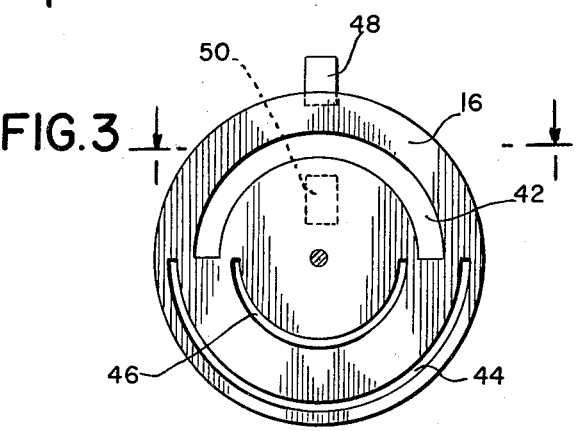

As shown in FIGURE 3, the bottom half of the chopper 16 may be referred to as its compensating sector. It includes, in this illustrative arrangement, two arcuate compensating slots 44 and 46. The compensating slot 44 is located farther from the center of the disc than any portion of the signal slot 42. The compensating slot 46 is located closer to the center of the disc than any portion of the signal slot 42.

The size and position of the aperture 40 defined by the mask and the size and positions of the compensating slots are such that the only light passing through the compensating slots 44 and 46 which may emerge through the exit slit and through the aperture 40, to strike the detector 34, is scattered light. This is in contradistinction to the arrangement of the signal slot 42, which permits light to pass directly through the monochromator and through the aperture 40 along the intended paths defined by the dispersing element and collimating means, to the detector 34, without the necessity of being scattered. There is, however, necessarily some scattered ligh reaching the detector through the slot 42.

In this particular embodiment, the apparatus is constructed and adjusted so that the scattered light reaching the detector through the slots 44 and 46 is approximately equal to the scattered ligh treaching the detector through the slot 42.

The overall action of this embodiment is thus such that scattered light will reach the detector 34 at all timese, and in an approximately constant quantity. When the signal portion of the chopper, including the slot 42, is in the path of the light, signal light will reach the detector 34 directly, and also scattered light. When the compensating portion of the chopper, including the slots 44 and 46, is in the path of the light, there will reach the detector 34 scattered light in an amount substantially equal to that when the signal portion is in the path.

The result is that the detector 34 generates an approximately constant (D.-C.) voltage component corresponding to the scattered light, and an alternating or pulsating voltage component corresponding to the desired, directly-transmitted light.

The amplifier 36 is designed to pass alternating components but not direct components, and as a result there is derived on the indicating device 38, an indication of the intensity of the selected portion of the spectrum, substantially independent of and free from the effects of scattered light.

The entrance slit is longer than the effective, unmasked portion of the exit slit. Stated differently, the entrance slit is longer than the effective vertical extent of the aperture defined by the mask 30. The reason for this is that the entrance slit accommodates both the used light and the compensating light. Theoretically, the length of the entrance slit employed for the used light and the compensating light will be equal, with a little additional space for clearance between each part. In practice, the entrance slit is still longer, to give an extra range for adjusting the balance between the chopper areas. There are provided adjustable masks 48 and 50 near the ends of the entrance slit, which may be slid up and down, to adjust the balance between the chopper areas, so that the scattered light reaching the detector through the compensating slots may be made equal to the scattered light reaching the detector through the signal slot in those embodiments where this feature is employed.

From the above description it may be seen that different portions of the entrance slit are used, for the light entering the system through the signal slot on the one hand, and the light entering through the compensating slots on the other. In the embodiment shown in FIGURES 1–3, the compensating slots are positioned so that light entering through them uses portions of the entrance slit higher and lower than the portions used by the light entering through the signal slot.

In one illustrative arrangement, the photo-responsive device 34 was a photronic cell, and the device 38 was an A.-C. voltmeter. The chopping disc had an open signal slot one-half inches in radial extent, and the two compensating slots each extended one-fourth inch in a radial direction. When such an apparatus is properly adjusted, the effect of scattered light can be reduced by a factor of more than 10, and in some cases by a much larger factor.

In the arrangement shown in the drawings, the chopper immediately precedes the entrance slit. Other locations for the chopper may satisfactorily be employed, but the chopper should precede the components which contribute significantly to the scattering in the monochromator. In order to have the slots of the chopper sharply focused on the mask 30, the chopper should be at a conjugate image point of the mask. The chopper may in some arrangements follow the entrance slit, and if so, the mask should follow the exit slit in order to focus sharply the slots of the chopper on the mask.

In other arrangements, the chopper can be located in the region of where the source 10 is shown in the drawings. Instead of locating the mask 30 in the immediate vicinity of the exit slit, there may be provided additional focusing means for forming an image of this slit at a subsequent point, and the mask may be located at this point.

Although the embodiment shown in the drawings includes the mask 30, and there are unique advantages in doing so, other arrangements may satisfactorily omit this mask. For example, if the detector 34 is placed right at the exit slit, and if its light-sensitive length in the vertical direction is equal to the mask opening which would be used, the mask may be satisfactorily omitted. That is, instead of employing the mask 30, the upper and lower limits of the sensitive length of the detector and the slots in the chopper should be positioned and dimensioned so that the detector receives a constant amount of scattered radiation but a pulsating amount of direct or signal radiation. The positions of the elements should be such that at least a major portion, and preferably all, of the radiation reaching the detector through the compensating slots should be scattered radiation.

In one form of the invention, the detector may be placed at a reduced image of the exit slit, and its sensitive length made equal to the reduced image of the opening of the mask 30. In this arrangement the mask 30 may be included or may be omitted. There are, however, definite practical advantages to including the mask.

Whether the mask 30 is employed no not, the relative positions of the chopper and the detector should, for best operation, be so arranged that the detector is sensitive to the scattered light from the compensating areas of the chopper but not to direct light from these areas.

From the above description of the embodiment just referred to, it will be understood that the A.-C. signal from the detector, representing the direct (unscattered) light, is alternating in nature because as the chopper rotates, direct light reaches the detector through the signal areas of the chopper, but little or none through the compensating areas. If a small amount of direct light from these compensating areas reaches the detector, the effect is to diminish the amplitude of this A.-C. signal from the detector, which represents the direct light. The greater the variation in direct light reaching the detector as the chopper rotates, the greater this A.-C. signal. For best operation no direct light from the compensating areas should reach the detector, but even if a small amount does, the apparatus can still work, and the effects of scattered radiation in the output alternating signal can still be reduced or substantially eliminated, provided the amount of scattered radiation reaching the detector is substantially constant.

If the mask 30 is employed, those elements of the monochromator which produce the scattering should be located between the chopper and the mask.

The embodiment described above in connection with FIGURE 3, in which the scattered light reaching the detector through the compensating and signal portions of the chopper is equal (balanced) may be regarded as including the feature of chopping the additional (compensating) scattered light 180 degrees out of phase with the chopping of the other light, and at the same frequency. Embodiments will now be described in which this equality or balance of the scattered light as between the different portions of the chopper is not required. In one such arrangement, the additional (compensating) scattered light is chopped at a different frequency from the chopping of the other light. In another such arrangement, it is chopped at the same frequency, but at a phase difference other than zero or 180 degrees with respect to the chopping of the other light.

FIGURES 4, 5, AND 6

Figure 4:
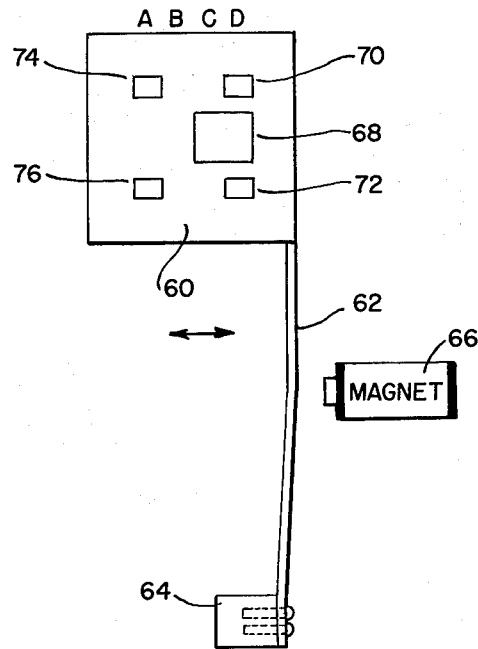
FIGURE 4 is a schematic view of another form of chopper, which may be used in connection with the circuit of FIG. 6.
Figure 5:
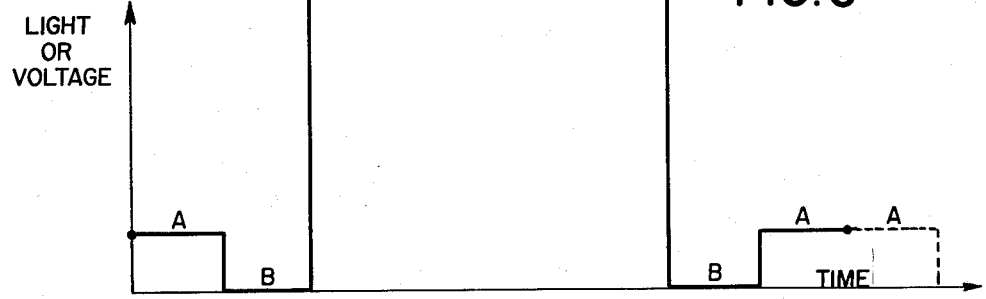
FIGURE 5 is a schematic diagram, representative of a wave form produced by motion of the chopper of FIGURE 4. The wave in FIGURE 5 represents the amount of light striking the photoelectric sensing element, or the voltage response of that element, as a function of time, in response to the vibrations of the chopper of FIGURE 4.
Figure 6:
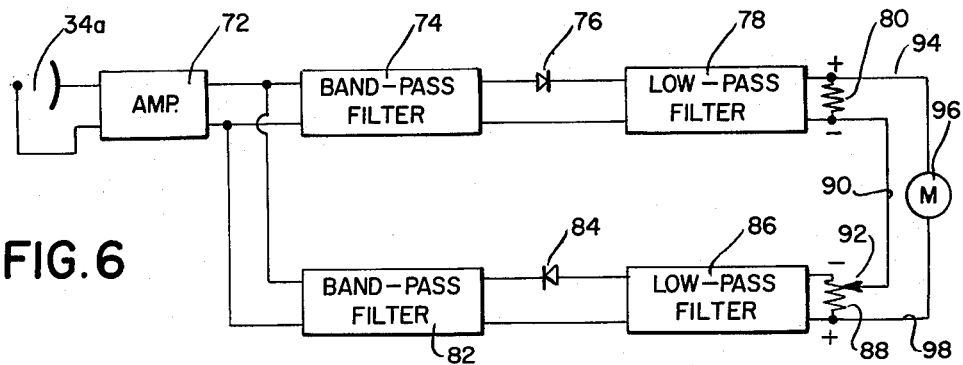
FIGURE 6 is a schematic circuit diagram of apparatus, including frequency-responsive elements, which may be used in connection with a chopper such as that illustrated in FIGURE 4.

Reference is now made to FIGURES 4, 5, and 6. In FIGURE 4, there is shown a chopper which may be used instead of the chopper shown in FIGURES 1-3, to produce an output signal including different frequency components representing respectively the desired and scattered light.

A chopper 60 is carried by a movable, resilient supporting member or reed 62, which in turn is supported on a frame member 64. The supporting member 62 is of ferromagnetic material, and juxtaposed to it is an electromagnet 66. There is provided a suitable electrical circuit, not shown, adapted repeatedly to actuate the magnet 66 so that it intermittently attracts the member 62, thereby causing that member and the chopper 60 to vibrate rapidly, left and right, at a uniform frequency.

Figure 2:
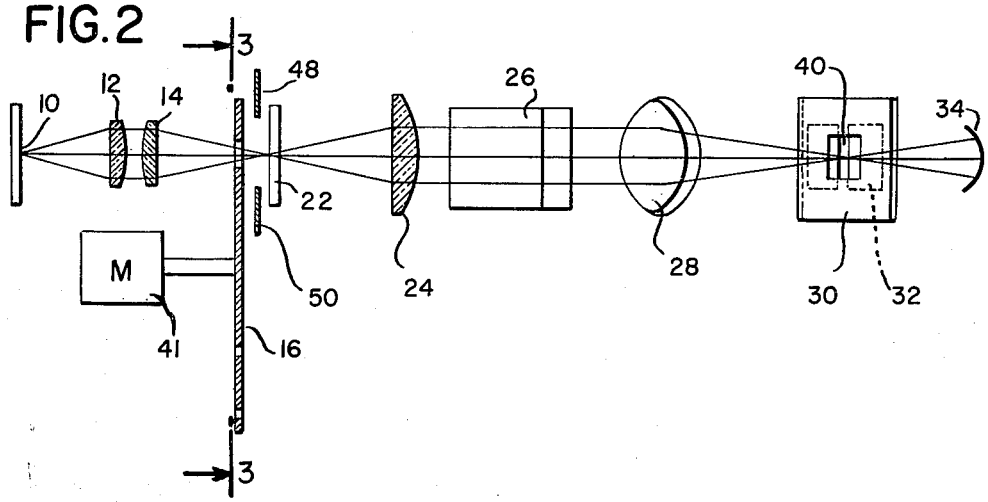

In this embodiment, the chopper 60 is employed in place of the chopper 16, in an optical system generally like that shown in FIGURES 1 and 2, but with special circuits, to be described.

The chopper 60 includes a signal slot or opening 68 positioned, like the signal slot 42 of the chopper 16, so that light passing through it may reach the photo-responsive detector directly. In addition to this light reaching the detector directly, there will necessarily be a certain amount of the light passing through the slot 68 which will reach the detector by scattering.

In addition to the signal slot 68, there are provided a plurality of compensating slots 70, 72, 74 and 76 in the chopper 60.

Additional light is directed into the monochromator through these compensating slots, and the position and arrangement of these slots in such, in relation to the masking means, that this additional light cannot reach the detector directly but only by scattering in the monochromator. Furthermore, the position and arrangement of these compensating slots is such that the additional light is chopped differently from the desired light which enters through the signal slot 68.

As the chopper 60 vibrates, the motion of the signal slot 68 produces a "fundamental" frequency component in the varying light which strikes the photoelectric detector and consequently a fundamental frequency component in the voltage output from the detector.

On the other hand, the motion of the compensating slots 70, as the chopper 60 vibrates, produces a "double-frequency" component in the light and voltage referred to above. It may be assumed that the motion of the chopper is of such amplitude that when the chopper is farthest to the right, the left-hand portions of the slots 74 and 76 are controlling the light beam, and when the chopper is farthest to the left, the right-hand portions of the slots 68, 70 and 72 are controlling the beam. The right-hand edges of the slots 68, 70 and 72 may, in this illustration, be assumed to be in alignment.

FIGURE 5 shows schematically the amount of light reaching the photo-responsive detector, or the voltage output from the detector, as a function of time, as the chopper 60 vibrates. The start of the graph, at the vertical axis, represents the moment when the chopper is at its extreme right-hand position. The time period when the slots 74 and 76 are in position to control the light is designated as A. As the chopper moves toward the left, the next condition is that none of the slots are in position to control the light. This time period is designated as B. As the chopper continues to move toward the left, the next time period C, represents the condition when only the signal slot 68 is in position to control the light. As the chopper approaches its farthest position toward the left, both the signal slot 68 and compensating slots 70 and 72 will be in position to control the light.

As the chopper vibrates through one full cycle, starting from its extreme right-hand position, moving to the left and then back to the starting position, conditions occur in the following order: A, B, C, D, D, C, B, A. The result is shown in FIGURE 5. The signal slot 68 produces a large effect on the light, because, among other reasons, the light passing through this opening can reach the detector directly.

Superimposed upon the variation produced by the signal slot 68 is the variation produced by the compensating slots 70, 72, 74, and 76.

Analysis of the wave form shown in FIGURE 5 for one complete cycle, A, B, C, D, D, C, B, A, shows that each time the chopper moves through one cycle, the variation caused by the signal slot 68 completes one cycle. In addition, there are two full cycles in that component of the wave form caused by the action of the compensating slots. This may be most readily understood by consideration of the shape which the wave form would assume if the variation produced by the signal slot were subtracted out. The result is that the signal slot produces a fundamental component, having the same frequency as the vibration frequency of the chopper, and the compensating slots produce a double-frequency component. The magnitudes of the fundamental frequency component and of the double frequency component need not be the same, and are not in FIG. 5.

A circuit arrangement will now be described which includes frequency-responsive elements for discriminating between the different frequency components described above. This circuit derives one output voltage related to the light reaching the detector through the signal slot 68. It derives another output voltage related to the light reaching the detector through the compensating slots. The first of these voltages may be considered to represent directly-transmitted light together with undesired scattered light. The second of these voltages may be considered to represent only scattered light. The circuit arrangement then, in effect, subtracts the second of these voltages from the first of these voltages, thereby obtaining a difference voltage which represents only the desired light, free from the effects of the scattered light.

As shown in FIGURE 6, the detector 34a, which receives the light controlled as described above, is connected to an amplifier 72. The output from the amplifier 72 is applied to a first band-pass filter 74, adapted to select the fundamental component referred to above. The output from this filter is applied ot a rectifier 76 connected to a low-pass filter 78, to produce across an output resistor 80 essentially a D.-C. voltage having a polarity as shown in FIGURE 6.

The output from the amplifier 72 is also applied to a band-pass filter 82, adapted to select the double-frequency component referred to above. The output from this filter is applied to a rectifier 84, turned in a direction opposite to that of the rectifier 76. The output from this rectifier 84 is applied to a low-pass filter 86, and there is produced across a resistor 88 in the output circuit of this filter essentially a D.-C. voltage having a polarity as shown in FIGURE 6.

One end of the resistor 80 is connected by a lead 90 to a variable slider 92 on the resistor 88. The other end of the resistor 80 is connected by a lead 94 to a D.-C. voltmeter 96, which is also connected by a lead 98 to the end of the resistor 88 having a polarity like that end of the resistor 80 to which the lead 94 is connected.

As a result, the voltages applied to the meter 96 are in opposition, or bucking one another. The voltage applied to the meter 96 is the voltage from the resistor 80 minus the voltage from the effective part of the resistor 88. By varying the slider 92, the apparatus may be so balanced as to produce on the meter 96 a reading representing the effect of only the desired, directly-transmitted light passing through the signal slot 68, without the effect of scattered light.

The scattered light reaching the detector through the compensating slots need not be exactly equal to the scattered light reaching the detector through the signal slot. That is, even though these quantities may be unequal, the circuit of FIGURE 6 enables the effects of scattered light to be balanced out electrically, by adjustment of the slider 92. The circuit produces a first voltage across the resistor 80 representing desired light plus scattered light. It also produces between the lead 98 and the slider 92, a second voltage having a value corresponding to that part of the voltage across the resistor 80, which represents scattered light.

The circuit then subtracts one of the voltages from the other, and derives a voltage and an indication representing only the desired light.

FIGURES 7 AND 8

Reference is now made to FIGURES 7 and 8, which show an embodiment of a chopper and an associated circuit which, instead of using frequency discrimination, use phase discrimination.

It may be assumed that the chopper of FIGURE 7 is employed with an optical system like that of FIGURES 1 and 2, but instead of the detector and associated circuits of FIGURES 1 and 2, there is employed a detector and associated circuits like that shown in FIGURE 8.

In FIGURE 7 there is provided a chopper disc 102 having a signal slot 104 and a pair of compensating slots 106 and 108, disposed, as shown, so that the chopper may be regarded as comprising four sectors, E, F, G, and H. The E sector includes the signal slot 104 and also the compensating slots 106 and 108. The F sector includes the compensating slots 106 and 108, but not the signal slot 104. The G sector includes neither signal nor compensating slots. The H sector includes the signal slot 104, but not the compensating slots.

The chopper is, for example, rotated clockwise by a motor driven shaft 112, which carries a cam 114, and another cam 116 displaced angularly from the first cam. The angular displacement of the cam 116 with respect to the cam 114, 90 degrees for example, corresponds to the angular displacement of the slots 106 and 108 with respect to the slot 104.

Associated with the cam 114 is a follower or contact member 118, pivotally mounted at its left-hand end on a support.

Cooperating with the right-hand end of the member 118 are stationary switch contacts 120 and 122. The shape of the cam 114 and the arrangement of the follower and the contacts, are such that the follower member 118 is, during half the cycle of rotation, engaged with the contact 120 but not with the contact 122. It is then substantially instantaneously shifted away from the contact 122 and into engagement with the contact 120, where it remains for substantially another half cycle. The switching action is then repeated each cycle.

The cams 114 and 116 include insulating means so as to avoid short-circuiting their associated follower members to the frame of the apparatus.

There is provided a follower member 124 associated with the cam 116. The member 124 is pivotally mounted at its left-hand end on a support. It cooperates with stationary contact members 126 and 128.

The shape of the cam 116 and the arrangement of the follower member 124, together with the contacts 126 and 128, are such that as the shaft 112 rotates, the member 124 is in engagement with the contact 126 half a cycle, and then is substantially instantaneously switched away from the contact 126 and into engagement with the contact 128. This switching action is periodically repeated as the shaft rotates.

The switching of the member 118 is synchronized with the motion of the signal slot 104. The switching of the member 124 is synchronized with the motion of the compensating slots 106 and 108. The signal slot 104 is displaced in space from the compensating slots 106 and 108, because the arc through which it extends on the chopper is not exactly coextensive at all points with the arc for the compensating slots. As the chopper rotates, the result is that there is a time phase difference between the effect of the signal slot on the light, and the effect of the compensating slots. The switching action of the member 118 is so controlled that the switching of the member 118 is in time phase with the effect of the signal slot 104. The switching action of the member 124 is, on the other hand, in time phase with the effect of the compensating slots 106 and 108. One way, illustrated in FIGURE 7, of producing this action, is to orient the cams 114 and 116 on the shaft 112 at different angular positions from one another, and in such relation to their associated follower and contact members, and to their associated slots in the chopper, as to provide the action described above. Thus, for example, if the follower members 118 and 124 are similarly oriented, the cams 114 and 116 may be displaced from one another by, say, 90 degrees on the shaft, as shown.

A number of other arrangements may be employed to produce the desired synchronism. For example, the cams may be similarly oriented and their associated follower members may be displaced by 90 degrees from one another. Thus one of the follower members may be horizontal, and the other may be vertical.

The member 118 and its associated contacts 120 and 122 serve as a rectifier or phase detector in the circuit of FIGURE 8, in a manner to be described. The same is true of the member 124 and its associated contacts 126 and 128.

In the arrangement illustrated in FIGURE 7, the synchronism of the switching action of the members 118 and 124, as the chopper rotates, may be conveniently summarized by the table below. Column (1) shows the quadrant of the chopper passing through the light beam. Column (2) shows the slots in that quadrant, affecting the light. Column (3) shows which of the contacts 120 and 122 is being engaged by the member 118, at any moment. Column (4) shows which of the contacts 126 and 128 is being engaged by the member 124 at any moment.

| (1) Effective quadrant | (2) Slots affecting light | (3) Contact engaged by member 118 | (4) Contact engaged by member 124 |
| --- | --- | --- | --- |
| E | 104, 106, and 108. | 120 | 126 |
| F | 106 and 108 | 122 | 126 |
| G | None | 122 | 128 |
| H | 104 | 120 | 128 |

It may be assumed that the chopper 102 is so dimensioned and positioned with respect to other portions of the monochromator that light of the desired wave length passing through the signal slot 104 can readily reach the detector by direct paths (without scattering), along with some scattered light. The compensating slots of the chopper are positioned with respect to the other components so that light passing through the compensating slots can reach the detector only by scattering and not directly.

There will now be described in connection with FIGURE 8, along with FIGURE 7, a phase-detection type of circuit arrangement whereby the effect of the scattered light passing through the compensating slots is determined, and the effect of desired light plus scattered light passing through the signal slot is separately determined. The two effects are separated from one another by phase-detection. The system operates to subtract the effect of the scattered light from the effect of desired plus scattered light, so as to obtain substantially only the effect of the desired light. This is accomplished as shown in FIGURE 8.

In FIGURE 8 there is shown a detector or photo-responsive device 34b connected to an amplifier 134. In the output circuit of the amplifier 134 there is a first transformer having a primary winding 136 and a secondary winding 138. There is also a second transformer having a primary winding 140 and a secondary winding 141. One terminal of the winding 138 is connected to the contact 120 by a lead 142, and the other terminal to the contact 122 by a lead 143. The contact or follower member 118 is connected to a resistor 144, a resistor 146, a lead 148, and a lead 150, in series, to a center tap 152 of the winding 138.

As the slot 104 rotates through the light, the effect which it tends to contribute to the modulation of the light is in the nature of approximately a square wave. It may be assumed, for the sake of illustration, that when the switching action of the member 118 is such that when the upper end of the transformer winding 138 becomes positive, the member 118 engages the contact 120, and thus causes positive current to flow downwardly through the resistor 144 and the resistor 146, and thence back through the leads 148 and 150 to the center tap 152 of the transformer winding. At this moment, the member 118 will not engage the member 122, and no current consequently flows through the lead 143.

When the position of the slot 104 changes, and the member 118 is quickly switched away from the contact 120 and into engagement with the contact 122, this will correspond to the condition when, in this example, the lower end of the transformer 138 becomes positive, and hence positive current will flow from the lead 143, the contact 122, the member 118, downwardly through the resistors 144 and 146 and back through the leads 148 and 150 to the center tap 152 of the transformer winding 138. At this moment no current will flow through the lead 142, because its contact 120 is not being engaged by member 118.

Therefore, it may be seen that the synchronized switching of the member 118 causes the circuit just described to be responsive to the voltage component having the phase determined by the motion of the slot 104. Another effect is that the switching of the member 118 causes its associated circuit to discriminate against, or be unresponsive to the voltage component having the phase determined by the motion of the compensating slots 106 and 108 because this component is out of phase with, and in this illustration is in quadrature with, the component with which the motion of the member 118 is synchronized.

In order to hold the voltage across the resistor 146 relatively constant, a condenser 154 is connected across that resistor. This condenser should be large enough so that the time constant provided by it, together with the resistance in its associated discharge path, is large compared with the period of the fluctuations which would otherwise appear across the resistance 146.

In like manner there is provided a phase-discriminating circuit associated with the transformer winding 141, but controlled by the movable member 124, so as to be responsive to voltage components produced by the motion of the compensating slots 106 and 108. For this action, the upper terminal of the winding 141 is connected by a lead 156 to the contact 126. The lower terminal of the winding 141 is connected by a lead 158 to the terminal 128. The follower or contact member 124 is connected by a resistor 160 and a resistor 162 to the point 164 which represents the junction between the resistor 146, the lead 148 and the resistor 162. The lead 148 is connected by a lead 166 to the center tap 168 of the transformer winding 141.

As the chopper rotates, the action of the compensating slots 106 and 108, as they pass into and out of positions where they affect the light, will be to tend to contribute to the modulation of the light reaching the photo-responsive device 34b a square-wave component, out of phase with, and here illustrated as in quadrature with, the square-wave component contributed by the slot 104.

Thus let is be assumed that when the slots 106 and 108 are affecting the light, and consequently the member 124 is engaging its contact 126, the upper end of the winding 141 becomes positive. Positive current will then flow through the lead 156, the contact 126, the member 124, upwardly through the resistors 160 and 162, to the left through the lead 148, and then downwardly through the lead 166 and back through the center tap 168 of the winding 141. When the compensating slots 106 and 108 are no longer in position to affect the light, and the member 124 is in engagement with the contact 128, the lower end of the transformer 141 will become positive, and current will flow from it through the lead 158, the contact 128, the member 124, upwardly through the resistors 160 and 162, and then back through the leads 148 and 166 to the center tap 168 of the transformer.

To maintain the voltage drop across resistor 162 relatively constant, a condenser 170 is connected across this resistor. Its action is comparable to that of the condenser 154.

The voltage across the resistor 162 is responsive to the voltage component contributed by the compensating slots, but unresponsive to the quadrature voltage component contributed by the signal slot.

To sense the output from the system, there is provided a D.-C. voltmeter 172. One terminal of this meter is connected to the upper end of the resistor 146. The other terminal of the meter is connected to a slider 174 which provides a variable tap along the resistor 162. Bearing in mind the polarity of the voltages across the resistors 146 and 162, it may be observed that the net voltage appearing across the terminals of the meter 172 is the voltage across the resistor 146, minus the voltage between the point 164 and the slider 174. That is, the connections are such that the polarity of the voltage across the resistor 146 is opposed to the polarity of the voltage across that part of the resistor 162 across which the meter is connected. In the illustration just described, the upper end of the resistor 146 is positive with respect to the potential at the point 164, but the lower end of the resistor 162 is positive with respect to the potential at the point 164.

More generally, there has been described a phase-discriminating system including a first phase detector synchronized with the motion of the signal slot 104, and a second phase detector synchronized with the motion of the compensating slots 106 and 108. The output voltages from these two phase detectors are connected together in a subtracting circuit so as to provide on an indicator device an indication responsive to the effect of the signal slot 104 (desired light plus scattered light) minus the effect of the compensating slots 106 and 108 (scattered light), this indication representing the desired light, free from the effects of scattered light.

Thus the signal slot and the compensating slots produce, with the other elements, voltage components which differ in phase. These voltage components are phase detected and the resulting detected voltages are subtracted from one another, to produce the desired result.

The balancing or the adjusting of the apparatus is done by means of the adjustable slider 174. It is unnecessary that the compensating slots be so proportioned that the scattered light reaching the device 34b through them be equal to the scattered light reaching it through the signal slot. Instead, the balancing is done by the electric circuit. The adjustment of the slider 174 is such that a large enough compensating voltage between the slider 174 and the terminal 164 is derived so that, when it is subtracted from the voltage across the resistor 146, the net effect on the meter 172 is to produce an indication of only the directly-transmitted light, whereby the effect of the scattered light components are substantially eliminated.

To balance the apparatus, there is employed a sample which has substantially no transmission in a region where scattered light is to be eliminated. The results will be that under this condition, scattered light will reach the device 34b but not direct light. The slider 174 is then adjusted so as to produce on the meter 172 a zero indication. This adjusts the aparatus so that when other samples are used, the effect of the scattered light will be substantially eliminated.

A generally similar procedure is employed to balance the system of FIG. 6, where the slider 92 provides the adjustment, instead of the slider 174 of FIG. 8.

Although rotating choppers have been illustrated with the scattered-light-balancing system and the phase-detecting system described above in connection with FIGURES 3 and 7, and a vibrating chopper has been illustrated in connection with the frequency-detecting system in connection with FIGURE 4, either rotating, vibrating, or other types of choppers may be employed with any of these systems.

Although for simplicity a half-wave type of rectifier was shown in FIGURE 6, a phase-sensitive full-wave type of rectifier similar to that shown in FIGURE 8 may be advantageously employed instead, synchronized with motion of the chopper of FIG. 4.

Although in FIGURE 1 the meter 38 may be an A.-C. voltmeter, it may advantageously comprise a rectifier and a recording D.-C. voltmeter. In this latter arrangement, the D.-C. and A.-C. waves are applied to the amplifier 36 from the detector 34. Blocking condensers or other means within the amplifier block the D.-C., which represents the undesired light components, and transmit the A.-C., which represents the desired light components. The transmitted A.-C., now free from the effects of scattered light, is then rectified and filtered. The resulting D.-C. is measured by the recording D.-C. voltmeter.

While an illustrative form of the invention has been disclosed in considerable detail, it will be understood that various changes may be made in the construction and arrangement of the several parts without departing from the general principles and scope of the invention as defined by the appended claims.

I claim:

1. In a photoelectric monochromator, in combination, a radiation-responsive device for producing an electrical signal, means forming an entrance slit and an exit slit, means, including dispersing means, for directing selected radiation from a source along a path including said entrance slit and onto said device, a radiation chopper in the path of said radiation, dispersing means including radiation scattering components in said path subsequent to said chopper, said chopper comprising a signal portion and a compensating portion for transmitting controlled amounts of radiation toward said device, said portions being spaced on said chopper relative to said path of radiation so that said signal portion chops light passing through a portion of the length of said entrance slit and said compensating portion chops light passing through a substantially different portion of the length of said entrance slit, said signal and compensating portions of said chopper being dimensioned and positioned in relation to the other components of said monochromator so that radiation passing through said entrance slit and said signal portion is transmitted through said exit slit to said device both directly and by scattering, but so that substantially all the radiation transmitted to said device through said compensating portion reaches said device through said exit slit only by scattering, said scattering occurring after said entrance slit and after said chopper, said portions of said chopper being adapted to cause said device to produce an electrical response comprising a first component directly related to radiation comprising said desired, directly-transmitted radiation and a second component directly related to said scattered radiation, and means responsive to said device and to said components for producing an indication related to said directly-transmitted radiation but substantially free from the effects of scattered radiation.

2. Apparatus as in claim 1, in which said chopper is adapted to cause said device to produce an alternating electrical component related to said directly-transmitted radiation, and a D.-C. electrical component related to said scattered radiation, and said means responsive to said device is responsive to said alternating electrical component but not to said D.-C. electrical components.

3. Apparatus as in claim 1, in which said signal portion of said chopper is adapted to chop said radiation at a first frequency, and said compensating portion is adapted to chop said radiation at a second frequency, and said means responsive to said device includes frequency-responsive means for deriving from said electrical response a first quantity representing both directly transmitted and scattered radiation, and a second quantity representing essentially only scattered radiation, and means for subtracting said second quantity from first quantity.

4. Apparatus as in claim 1 in which said chopper is adapted to cause said electrical response to include out-of-phase components, and said means responsive to said device includes phase-detecting means for deriving a first quantity representing both scattered and directly-transmitted radiation, and a second quantity representing said scattered radiation, and means for subtracting said second quantity from said first quantity.

5. In a photoelectric monochromator including a radiation responsive device for producing an electrical signal, and means including an entrance slit, dispersing means, and an exit slit, for directing radiation of a selected wave length from a source along a path and onto said device, a radiation chopper in the path of said radiation, said dispersing means being subsequent in said path to said entrance slit and said chopper and prior to said exit slit, said chopper comprising a signal portion and a compensating portion repeatedly interposed in said path for transmitting controlled amounts of said radiation toward said device, said portions being spaced on said chopper relative to said path of radiation so that said signal portion chops light passing through a portion of the length of said entrance slit and said compensating portion chops light passing through a substantially different portion of the length of said entrance slit, said signal and compensating portions of said chopper being dimensioned and positioned in relation to the other components of said monochromator so that radiation passing through said entrance slit and said signal portion is transmitted to said device both directly and by scattering, but that substantially all the radiation transmitted to said device through said entrance slit and said compensating portion reaches said device only by scattering, said scattering occurring after said entrance slit and after said chopper, said portions of said chopper being adapted to chop said radiation differently, to cause said device to produce an electrical response which is different in characteristic at different intervals, and means connected to said device responsive to the said difference in characteristic for producing an indication which, in response to the action of the compensating and signal portions of said chopper in transmitting light passing through different parts of the length of the entrance slit, is related to said directly-transmitted radiation but which is substantially free from the effects of scattered radiation.

6. Apparatus as in claim 5 in which said signal portion of said chopper is adapted to cause said device to produce, at certain intervals, an electrical response including electrical components related to both directly-transmitted and scattered radiation, and said compensating portion is adapted to cause said device to produce, at other intervals, and electrical response related to said scattered radiation, and means for deriving from said electrical responses an alternating component related to only said directly transmitted radiation.

7. Apparatus as in claim 5 in which said compensating portion of said chopper is adapted to chop said radiation at a first frequency, and said signal portion is adapted to chop said radiation at a second frequency, and said means connected to said device includes frequency-responsive means.

8. Apparatus as in claim 5 in which said signal portion of said chopper is interposed in said path in time intervals at least partly out of phase with the time intervals when said compensating portion is interposed in said path, said means connected to said device includes a phase detector, and means for synchronizing the operation of said phase detector with said chopper.

9. In apparatus for measuring a portion of a spectrum, in combination, means forming an entrance slit for admitting light from a source, means forming an exit slit, collimating means and a dispersing element for forming at said exit slit a dispersed image of said entrance slit, a detector for receiving light passing through said exit slit, a mask for limiting the light passing through said exit slit to a predetermined aperture, a chopper located in the path of said light from said source, in the region of said entrance slit, said dispersing element including radiation-scattering components in said path subsequent to said chopper, said chopper having at least one signal slot located to permit the passage of chopped light through a portion of the length of said entrance slit and through said aperture to said detector, including signal light reaching said detector directly and also scattered light, and having at least one compensating slot, located to permit the passage of chopped light through a substantially different portion of the length of said entrance slit and along a path in which its major portion is intercepted by said mask but whereby substantially only scattered light may pass through said entrance slit, said compensating slot, said aperture of said mask and said exit slit to said detector, said chopper being adapted to chop said light so as to cause said detector to produce a signal in response to said slots, and output means connected to said detector selectively responsive to a component thereof which, in response to the action of said signal and compensating slots in transmitting light through substantially different portions of the length of said entrance slit, is substantially independent of the effects of scattered light.

10. Apparatus as in claim 9 in which said chopper is located near a conjugate image point of said mask.

11. Apparatus as in claim 9 in which said chopper is on the same side of said entrance slit as said mask is of said exit slit.

12. In combination, a radiation-responsive device for producing an electrical signal, means forming an entrance slit, means, including dispersing means, for directing radiation of a selected wave length from a source along a path including said entrance slit and onto said device, a radiation chopper in the path of said radiation, said chopper comprising a signal portion and a compensating portion, said portions being adapted alternately to transmit controlled amounts of said radiation toward said device, and means for actuating said chopper, said portions being spaced on said chopper so that said signal portion chops light passing through one portion of the length of said entrance slit and said compensating portion chops light passing through a substantially different portion of the length of said entrance slit, scattering of said radiation occurring after said entrance slit and after said chopper, said device and said portions of said chopper being so relatively positioned that radiation passing through said signal portion can reach said device both by scattering and by direct transmission without scattering, but that substantially all of the radiation which reaches said device through said compensating portion can do so only by scattering and not directly, said portions being dimensioned so that the scattered radiation reaching said device through said signal and compensating portions is approximately equal, so that said scattered radiation produces essentially a D.-C. signal component in said device, whereby only the unscattered radiation produces an alternating signal component in said device, and means selectively responsive to said alternating signal component, whereby the said scattered radiation is compensated for by the action of said signal and compensating portions of said chopper in transmitting radiation through different parts of the length of said entrance slit.

13. In apparatus for measuring a portion of a spectrum, in combination, a radiation detector for producing a signal, means directing radiation along a path leading toward said detector, masking means including means defining an entrance slit at one point in said path and an exit slit at a subsequent point in said path, a dispersing element in said path between said slits, a moving radiation chopper in said path in the region of said entrance slit, scattering of said radiation occurring after said entrance slit and after said chopper, said chopper having a signal section and a compensating section, each of said sections including a radiation-transmitting area and an area relatively opaque to radiation of the wave lengths being measured, the transmitting area in said compensating section being located to transmit radiation entering through only a first portion of the length of said entrance slit and passing along a portion of said path intersecting a portion of said masking means, whereby only scattered portions of said radiation may reach said detector when said compensating portion is in said path, the transmitting area in said signal section being located to transmit radiation entering through a portion of the length of said entrance slit including a region substantially different from said first portion and passing along an unmasked portion of said path, whereby it may directly reach said detector, along with scattered radiation, the relative size of said transmitting areas being so balanced that the scattered radiation reaching said detector during times when said signal section of said chopper is affecting said radiation is approximately equal to that when said compensating section is affecting said radiation, whereby scattered-radiation components in the alternating signal from said detector are minimized by the action of said signal and compensating sections of said chopper in transmitting light through said different portions of the length of entrance slit.

14. Apparatus as in claim 13 in which said masking means includes a movable element, adjustable in position toward and away from said path, adapted to limit the path of said light to provide the said balance between said transmitting areas.

15. In combination, means forming an entrance slit, a photoelectric device, means including dispersing means for directing radiation of a selected wave length from a source along a path including said entrance slit and onto said device, a radiation-chopper comprising a slotted signal portion and a slotted compensating portion, said portions being spaced on said chopper relative to said path of directed radiation, means for moving said chopper so that its said portions pass through said path, dispersing means including radiation-scattering components in said path subsequent to said chopper, and masking means in said path subsequent to said scattering components defining an aperture limiting the path of said radiation, said compensating portion of said chopper being adapted to transmit radiation at such positions that it may pass through said aperture only by scattering, said signal portion being adapted to transmit radiation at such positions that it may pass through said aperture both directly and by scattering, said slots in said chopper being dimensioned and positioned so that, as said chopper moves, said signal portion of said chopper chops light passing through a first portion of the length of said entrance slit and said compensating portion chops light passing through a portion substantially different from said first portion, of the length of said entrance slit and so that a constant amount of scattered radiation reaches said photoelectric device but pulsating amounts of signal radiation reach said device, whereby scattered radiation components in the alternating portion of the signal from said device are minimized.

16. In combination, means forming an entrance slit, a photoelectric device, means, including dispersing means, for directing radiation of a selected wave length from a source along a path including said entrance slit and onto said device, a light-chopping disc in the path of said radiation, scattering of said radiation occurring after said entrance slit and after said chopping disc, said chopping disc comprising a semi-circular signal sector and a semi-circular compensating sector, each shaped to include at least one slot running in a circumferential direction, said slots being at different radial distances from the center of said disc, said slot of said signal sector being positioned so that radiation passing through it can pass through a first portion of the length of said entrance slit and can reach said device both by scattering and by direct transmission without scattering, but said slot for said compensating sector being positioned so that radiation passing through it can pass through a second portion of the length of said entrance slit substantially different from said first portion and can reach said device only by scattering and not directly, said slots being positioned and dimensioned so that the scattered radiation reaching said device is approximately constant as said disc rotates so that said scattered radiation produces a D.-C. component, whereby, as a result of the action of said signal and compensating slots in transmitting radiation passing through different portions of the length of said entrance slit, only the unscattered radiation produces an alternating signal component.

17. In combination, means forming an entrance slit, a radiation-responsive device for producing an electrical signal, means, including dispersing means, for directing radiation of a selected wave length from a source along a path including said entrance slit and onto said device, a radiation chopper in the path of said radiation, scattering of said radiation occurring after said entrance slit and after said chopper, said chopper comprising a signal portion and a compensating portion, means actuating said chopper to pass said portions thereof alternately through said radiation path, each of said portions having opaque areas and radiation-transmitting areas, said device and said transmitting areas of said chopper being so relatively positioned on said chopper that radiation passing through said signal portion can pass through a first portion of the length of said entrance slit and can reach said device both by scattering and without scattering, but so that at least the predominant portion of the radiaion reaching said device through said compensating portion does so by scattering, said compensating portion being positioned to chop radiation passing through a second portion of the length of said entrance slit substantially different from said first portion thereof, said portion of said chopper being dimensioned so that the scattered radiation reaching said device through said signal and compensating portions is approximately equal, whereby said scattered radiation produces essentially a D.-C. component from said device, but so that a much larger amount of unscattered radiation reaches said device through said signal portion than through said compensating portion, whereby an alternating signal component is produced by said unscattered radiation but not by said scattered radiation, so as to compensate for the effect of said scattered radiation by the action of said signal and compensating portions of said chopper in transmitting radiation passing through different portions of the length of said entrance slit.

18. In a monochromator including an entrance slit, an exit slit and a photoelectric detector positioned to receive both scattered and signal light, a moving light chopper in the path of said light having signal and compensating slots, scattering of said light occurring in said monochromator after said entrance slit and after said chopper, said slots being spaced on said chopper relative to said path of light so that said signal slot intermittently transmits light passing through a region extending along a portion of the length of said entrance slit and said compensating slot intermittently transmits light passing through a region extending along a substantially different portion of the length of said entrance slit, said portion of said chopper being dimensioned and positioned so that as said chopper moves it chops said light differently in different time intervals, to cause said detector to produce a signal in response to said slots, and output means connected to said detector selectively responsive to said signal to receive a signal component which, because of the action of said signal and compensating slots in transmitting light passing through different portions of the length of said entrance slit, is substantially independent of the effects of scattered light.

19. In a monochromator including an entrance slit, an exit slit, and a photoelectric detector positioned to receive both scattered and signal light, a light chopper in the path of said light having signal and compensating sections which alternately affect said light, scattering of light occurring in said monochromator after said entrance slit and after said chopper, said sections being spaced on said chopper relative to said path of light and relative to said entrance slit so that said signal section intermittently transmits light passing through a region extending along a portion of the length of said entrance slit, and said compensating section intermittently transmits light passing through a region extending along a substantially different portion of the length of said entrance slit, said compensating section being adapted to enable scattered light to reach said detector in amounts approximately equal to the scattered light which reaches said detector via said signal section, whereby said action of said signal and compensating sections compensates for the effect of scattered light.

20. In a photoelectric monochromator including means forming an entrance slit and means for directing radiation through said entrance slit and the remainder of said monochromator, a partly opaque radiation chopper having a signal slot and a compensating slot, scattering of said radiation occurring after said entrance slit and after said chopper, means for moving said chopper through said radiation to chop it, said slots being spaced in relation to each other and to said radiation so that said signal slot is positioned to transmit chopped light passing through a first portion of the length of said entrance slit and said compensating slot is positioned to transmit chopped light passing through a second portion of the length of said entrance slit including a region substantially different from and displaced longitudinally with respect to said first portion, said slots being dimensioned and positioned so that said signal slot passes through a path along which said radiation can pass through said monochromator both directly and by scattering and said compensating slot passes through a path along which said radiation can pass through said monochromator only by scattering, whereby to compensate for the effect of scattered radiation, and means selectively responsive to radiation passing through said slots.

21. In apparatus for measuring the intensity of a selected portion of a spectrum, in combination, means forming an entrance slit, means for directing radiation along a predetermined path including said entrance slit, a radiation chopper in the path of said radiation and having a signal portion positioned to transmit radiation through said monochromator both directly and by scattering, and a compensating portion spaced relative to said signal portion to transmit radiation through said monochromator only by scattering, said scattering occurring subsequent to said entrance slit and subsequent to said chopper, said signal portion being positioned to traverse said radiation in the region of a portion of the length of said entrance slit, said compensating portion being positioned to traverse said radiation in the region of a second portion of the length of said entrance slit substantially different from and displaced longitudinally with respect to the first-mentioned portion of the length thereof, said portions of said chopper being effective, when said chopper is actuated, to transmit radiation in time intervals which are at least partly non-concurrent, and means selectively responsive to said non-concurrent chopped radiation for translating such radiation into an output electrical signal which, in response to the action of said signal and compensating portions of said chopper in transmitting light passing through different portions of the length of said entrance slit, is related only to unscattered radiation transmitted through said chopper, free from the effects of scattered radiation.

References Cited in the file of this patent

UNITED STATES PATENTS

| | | |
|---|---|---|
| 1,979,964 | Duffendack et al. | Nov. 6, 1934 |
| 2,043,053 | Martin | June 2, 1936 |
| 2,526,509 | Shawhan | Oct. 17, 1950 |
| 2,577,815 | Saunderson et al. | Dec. 11, 1951 |
| 2,607,899 | Cary et al. | Aug. 19, 1952 |
| 2,631,489 | Golay | Mar. 17, 1953 |
| 2,679,184 | Atwood | May 25, 1954 |
| 2,743,646 | Strong | May 1, 1956 |

UNITED STATES PATENT OFFICE
CERTIFICATION OF CORRECTION

Patent No. 3,004,465　　　　　　　　　　　　　　October 17, 1961

John U. White

It is hereby certified that error appears in the above numbered patent requiring correction and that the said Letters Patent should read as corrected below.

Column 1, line 43, after "desired" insert -- wave --; column 4, line 7, for "ligh treaching" read -- light reaching --; line 11, for "timese" read -- times --; column 5, line 33, for "no" read -- or --; column 6, line 33, for "in", first occurrence, read -- is --; column 7, line 43, for "ot" read -- to --; column 11, line 73, for "results" read -- result --; column 16, line 46, for "radiaion" read -- radiation --.

Signed and sealed this 17th day of April 1962.

(SEAL)
Attest:

ESTON G. JOHNSON
Attesting Officer

DAVID L. LADD
Commissioner of Patents